United States Patent [19]
Howard

[11] 3,935,319

[45] Jan. 27, 1976

[54] PROTEIN FOOD PRODUCT

[75] Inventor: Norman Bratton Howard, Oxford, Ohio

[73] Assignee: The Procter & Gamble Company, Cincinnati, Ohio

[22] Filed: May 28, 1974

[21] Appl. No.: 473,544

[52] U.S. Cl. .............. 426/104; 426/274; 426/574; 426/601; 426/656; 426/802
[51] Int. Cl.² ........................................... A23J 3/00
[58] Field of Search ........... 426/167, 194, 199, 201, 426/212, 274, 362, 364, 802, 202, 104, 574, 601, 656; 424/231, 182

[56] References Cited
UNITED STATES PATENTS

| | | | |
|---|---|---|---|
| 2,796,381 | 6/1957 | Borst | 424/182 |
| 3,248,232 | 4/1966 | Krajewski | 426/303 |
| 3,498,793 | 3/1970 | Page et al. | 426/212 X |

*Primary Examiner*—A. Louis Monacell
*Assistant Examiner*—R. A. Yoncoskie
*Attorney, Agent, or Firm*—Jerry J. Yetter; Julius P. Filcik; Richard C. Witte

[57] ABSTRACT

A protein food product comprising a mixture of edible protein fibers, and a stabilized fat consisting of 85–95% by weight edible triglyceride and 5–15% by weight ethyl cellulose.

16 Claims, No Drawings

PROTEIN FOOD PRODUCT

BACKGROUND OF THE INVENTION

1. Field of the Invention

The field of this invention relates to fat-containing protein food products, particularly meat analog food products formed from fibrous texturized protein.

2. Description of the Prior Art

A variety of fat-containing protein food products are known in the prior art. A problem associated with many such food products is that the fat phase separates from the protein phase. It is often desirable, however, to maintain the fat phase intimately admixed with the protein phase.

A particular example of a protein food product wherein it is desirable to maintain the fat phase admixed with the protein phase is a meat analog food product formed from texturized vegetable protein.

A variety of prior art processes are known for "texturizing" vegetable protein, i.e., imparting to vegetable protein a fibrous, filamentary structure and toughness associated with meat, and assembling the texturized protein into familiar meat forms to provide meat analog products. For example, meat analog products can be made by processes involving fiber spinning or thermal plastic extrusion.

The fiber spinning technique is an adaptation of the spinnerette method of making synthetic textile fibers. In the meat analog adaptation of this method, fibrous protein products are prepared from proteins such as a soy protein by forming a spinning dope from alkali solubilized protein and extruding the dope through a perforated die (spinnerette) into an acid (isoelectric) precipitating bath. The acidic bath sets the filaments or fibers as they emerge from the spinnerette. Thereafter, the fibers are collected for subsequent processing. The fibers, during the collection process, are usually stretched to orient the molecular structure of the fibers; thereafter, the fibers are assembled in "tows", bundles of individual fibers aligned in parallel fashion. Binding agents, coloring, fat and flavor may be added to the fiber tows and the entire fiber mass is then shaped to resemble familiar meat products. Details regarding the techniques are disclosed, for example, in U.S. Pat. Nos. 2,682,466; 2,730,447 and 2,730,448.

The thermal plastic extrusion method of forming meat analog products is an adaptation of technology involved in making ready-to-eat cereal food products. The thermal plastic extrusion process involves preparing a mixture of protein material, water, flavor and other ingredients and thereafter feeding the mixture into a cooker extruder wherein it is subjected to heat and pressure and subsequently extruding the mixture. The extrudate filament as it enters into a medium of reduced pressure (usually atmospheric) expands to form a fibrous cellular structure. On rehydration, the fibrous filamentary product can possess an appearance, a bite and mouth feel comparable to cooked hamburger. Details regarding thermal plastic extrusion techniques for the forming of meat analogs are disclosed, for example, in U.S. Pat. Nos. 3,102,031 and 3,488,770. Wtih the use of suitable binders, products similar to hamburger patties, meat balls, meat loaves and meat chunks can be formed. A variety of other processes are known for providing very suitable meat analog products which approach the texture and appearance of a variety of natural meats.

Providing meat analog products having the basic appearance and fibrous texture of meats solves only a portion of the problem of providing desirable meat analogs which are substantially indistinguishable from real meat. Incorporating desirable fats and flavors in the meat analog is necessary to provide fully satisfactory meat analogs.

Incorporating nutritionally desirable liquid fats (oils) can be difficult because the liquid oil tends to separate from the protein filaments of the meat analog. The use of higher melting fats can be helpful, but on heating the product, these fats too tend to separate from the product. In addition, very high melting fats are less desirable nutritionally and can have an undesirable waxy mouthfeel.

Ethyl cellulose is a known item of commerce which has a wide variety of industrial applications, for example, in fields relating to coatings and pharmaceuticals. (See, Ethocel for Coatings Applications, The Dow Chemical Co., Copyright, 1966). Heretofore, it was known that this material can thicken vegetable oils (see, U.S. Pat. No. 2,796,381).

It would be desirable in fat-containing fibrous protein food products to stabilize the fat to provide the fat in a viscous or gelled state in order to inhibit separation of fat from the protein. To be acceptable, however, it is critical that the stabilized fat present an acceptable mouthfeel, i.e., to be acceptable, the stabilized fat cannot be slimy, sticky, gummy or waxy. In addition, it would be desirable to improve the flavor of fibrous protein food products.

SUMMARY OF THE INVENTION

In summary, this invention presents a protein food product comprising a mixture of edible protein fibers and a stabilized fat consisting of 85–95% edible triglyceride and 5–15% ethylcellulose, by weight.

It has been found that the stabilized fat employed in this invention does not readily separate from the product, and does not adversely affect the taste or mouthfeel of the product.

In another aspect of this invention, it has been discovered that incorporating suitable flavors into the stabilized fat provides a notable taste benefit.

DETAILED DESCRIPTION OF THE INVENTION AND ITS PREFERRED EMBODIMENTS

In its broad aspect, this invention provides a protein food product comprising a mixture of edible protein fibers, and a stabilized fat consisting of 85–95% edible triglyceride and 5–15% ethylcellulose, by weight of stabilized fat. In another aspect, this invention provides a shaped protein food product comprising a mixture of edible protein fibers, edible binder material, and a stabilized fat consisting of from 85 to 95% edible triglyceride and from 5 to 15% ethylcellulose, by weight of stabilized fat, the mixture being bound together to form a shaped fibrous protein food product. Most suitably, the product will resemble meat in both appearance and texture.

The protein fibers employed in this invention are most suitably texturized proteins formed by any of a variety of methods. A variety of suitable methods are known in the prior art. Suitable protein fibers can consist of from 30 to 100% protein, and from 0 to 70% materials associated with the protein source material or added adjuvant materials. Examples of adjuvant materials are carbohydrates, vitamins, and flavors, etc. Preferably the protein fibers consist of 50 to 100% protein, and most preferably 70 to 100% protein.

Suitable proteins for forming these protein fibers are available from a variety of sources. The usual source of such proteins is vegetable protein; however, animal protein may also be employed. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans can be dehulled and solvent extracted, preferably with hexane, to remove the oil therefrom. The resulting oil-free soybean meal contains about 50% protein.

The soybean meal can be processed in known manner to remove carbohydrates and obtain products with higher levels of protein, for example, soy protein concentrates containing about 70% protein or soy protein isolates containing about 95% or more protein. In turn, a variety of suitable prior art process can be employed to convert the soybean meal, concentrate, isolate and other edible protein bearing materials into suitable texturized edible protein fibers.

Suitable methods for converting protein bearing materials into protein fibers are disclosed, for example, in U.S. Pat. Nos. 2,682,466; 3,047,395; 3,142,571; 3,488,770; 3,498,794; 3,759,715; 3,778,522 and 3,794,731, all said patents being incorporated herein by reference.

The most suitable protein fibers will generally have a cross-section of from about 20 to about 500 microns. The fibers can be in form of a fiber bundle (tow) comprised of numerous fibrous filaments having a substantially larger cross-section. Fibrous cellular texturized proteins formed by expansion, for example, texturized proteins formed by extrusion as mentioned hereinbefore, represent numerous protein fibers bound together and are comparable to a tow of fibers.

Preferably the protein fibers are readily hydratable, and can hold from about 2 to 3 times their dry weight water.

Suitable edible triglycerides for utilization in the stabilized fat composition of this invention are well known and generally comprise liquid or semi-liquid glycerides derived from animal, vegetable, or marine fats and oils, including synthetically prepared shortenings. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernal oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. Most suitably, the triglyceride employed will have a melting point below 100°F. Preferably, the triglyceride employed is a liquid vegetable oil, soybean oil, cottonseed oil, and corn oil being especially preferred examples.

The stabilized fats employed in this invention are formed by adding to the edible triglyceride an amount of ethyl cellulose, a compound capable of gelling the edible triglyceride.

Suitable ethyl celluloses preferred for use in this invention are those having a degree of substitution (D.S.) of from about 2.21 to about 2.58/glucose unit, most preferably from about 2.42 to 2.53/glucose unit, and a viscosity factor of from about 4 to 200 cps. (Viscosity factor refers to viscosity determined in 80:20 toluene:ethanol by weight containing 5% concentration by weight ethylcellulose at 25°C.)

The stabilized fat gels employed in this invention are formed by adding from about 5 to 15%, by weight, ethyl cellulose to the edible triglyceride and heating the mixture, for example, to a temperature of from about 150°F to 350°F to disperse the ethyl cellulose. On cooling, a stabilized fat gel forms.

The resulting stabilized fat can be a viscous liquid (semi-solid) gel or a solid gel at room temperature depending on the concentration of the ethyl cellulose, and the particular ethyl cellulose and triglyceride employed. High concentrations of ethylcellulose, high melting point triglycerides and high viscosity factor ethylcelluloses tend to give hard gels; whereas the low concentrations of ethyl cellulose, low melting triglycerides (for example, liquid vegetable oil) and low viscosity factor ethyl celluloses tend to give soft gels.

The most suitable stabilized fats for use in this invention are those which have penetration values from 220 to 90. The penetration value is the number of tenths of a millimeter a standard cone penetrates a sample in 5 seconds. The cone employed has 19/32 inch diameter base, 2 inch length, tapers to a point having 1/32 inch diameter. The test procedure is A.S.T.M. method D-217 using the above described cone with a total weight of 47 grams.

Stabilized fats with significantly lower penetration values are too hard and can contribute an unnatural and undesirable mouth feel to the protein food product of the invention. Stabilized fats with significantly higher penetration values do not provide fats which are optimumly stabilized against separation.

Most preferably, the stabilized fats employed in this invention are solid gels at room temperature.

The amount of stabilized fat employed will vary significantly depending upon the exact product characteristics desired. Generally, the stabilized fat will be utilized at a ratio of from 1:0.01 to 1:0.8 by weight of protein fiber to stabilized fat.

An amount of edible binder can be employed to bind the protein fibers and stabilized fat together to form a shaped product. The particular amount of edible binder material placed upon the protein fiber mixture is not a critical aspect of this invention. Selection of the most suitable amount is dependent upon a number of circumstances such as the end product texture desired, the protein material utilized in forming the aggregated fibers, and the particular edible binder employed. As a general rule, an amount of binder should be employed to produce a product which has sufficient binder present to impart the necessary cohesiveness to the product such that the product remains together during handling and packaging and yet is not bound so tightly that the mouth eating quality of stringy meat is lost. Within this context, the ratio of fiber material to binder material employed should be within the range of from 95:5 to 5:95 and preferably from 75:25 to 20:80.

Examples of suitable edible binders are, for example, egg albumen, cereals, heat-coagulable proteins, and alginates. Generally, the edible binder will be at least a partially water-soluble edible binding material. Heat-coagulable protein binders are preferred.

The edible binder material is generally prepared for use by adding moisture to the edible binder material to form a water-edible binder mixture which is generally from 60 to 80% by weight of water, and preferably from 65 to 75% by weight of water. The edible water-binder mixture can be coated upon the fibers in a number of ways. For example, the edible binder-water mixture can be sprayed upon the protein fibers, extruded and placed upon the fibers as a thin film, placed upon the fibers by any other conventional coating means such as, for example dipping the fibers into the water-edible binder mixture, or mixing the fibers and binder together.

It should be noted that some edible protein fibers can be heat-coagulable and have an inherent cohesive character such that a thin coating of water alone will act as a suitable binder material. Therefore, the use of water as an edible binder is also contemplated by this invention.

Protein food products of this invention which are not shaped (for example, a ground meat analog) are formed by mixing together the stabilized fat and protein fibers.

The shaped fibrous protein food products of the invention are formed by mixing the stabilized fat, binder, and the protein fibers. The mixture is then shaped to provide a desirable form. If the binder requires heat to set and bind the product, the shaped product is heated to complete binding to form a stable unitary food product. The resulting shaped food product can be a meat analog, resembling, for example, a hamburger patty, meatball, or roast beef chunk.

A highly preferred embodiment of this invention involves adding to the stabilized fat flavoring ingredients, for example, meat flavor ingredients. In particular, it has been discovered that a distinct flavor advantage is achieved in the protein food products of this invention if the flavor is incorporated into the stabilized fat. The reasons why this flavor advantage is achieved are not fully understood. While not wishing to be bound by any theory, it is suggested that the advantage is due to a combination of factors involving (1) protection of the flavor by isolating it from the protein (flavors can become tightly bound to the protein and become unavailable), (2) concentrating the flavor so that it is more sharply perceived, and (3) sustaining the release of the flavor during mastication providing the desirable lingering taste sensation of natural meat products.

Suitable flavors for incorporation into the stabilized fat include water-soluble and oil-soluble flavors. While the particular amount of flavor employed will vary with the particular flavors employed, generally a suitable flavor content can be from about 5 to 50%, by weight, of the stabilized fat.

To achieve optimum taste advantage, it is important that the flavor be incorporated in the stabilized fat prior to gelling.

The following examples illustrate several preferred embodiments of the invention disclosed herein.

EXAMPLE I

Part A

A commercially available soy concentrate (containing about 70% protein) was extruded in a known manner as follows:

Sixty-five parts soy concentrate were mixed with 35 parts water, and the pH of the mixture was adjusted to 5.8 with HCl.

The resulting composition was extruded in a Brabender model 2503 extruder equipped with a medium compression (2:1) screw and an extrusion die containing a 3/16 inch diameter orifice. The extruder was maintained at a temperature of 175°C at the extrusion die and the front end of the barrel. The screw was rotated at a rate of 200 rpm.

The extruded product expanded rapidly on emerging from the die while releasing steam. The resulting product was a fibrous protein filament. The fibrous protein filament product can be dried in an oven at 60°C for 7 hours to obtain a storage stable product. When the dry product is added to water, it absorbs approximately three times its dry weight of water. The resulting hydrated product resembles loose cooked ground hamburger meat, and is characterized as a hamburger analog.

Part B

A stabilized fat composition was formed in the following manner.

To 90 parts liquid soybean oil (I.V. 107) was added 10 parts ethyl cellulose having about 2.58 ethoxyl groups/glucose unit and a viscosity designation of 45 cps. The resulting mixture was heated with stirring at a temperature of 200°C until the ethyl cellulose was completely dispersed. The mixture was then allowed to cool to room temperature (25°C).

On cooling, a stabilized fat gel formed. This stabilized fat melts at about 275°F and has a penetrometer value of 175.

The stabilized fat gel was chopped into pieces having a particle size of from about 2 to 10 mm (largest dimension).

Part C

A dry fat-containing protein food product of the invention was formed by mixing together 10 parts dry hamburger analog (Part A) and 5 parts by weight stabilized fat particles (Part B).

Part D

Shaped fat-containing protein food products were made by mixing together the following ingredients:

| | |
|---|---|
| Dry hamburger analog (Part A) | 12.1 parts |
| Fat | 5.7 |
| Water | 30.0 |
| Binder (dried egg white) | 6.8 |
| Flavor (dry roast beef extract) | 2.5 |
| Total | 57.1 |

Sufficient time was allowed for the dry ingredients (dry hamburger analog and binder) to hydrate and take up the water. Fifty grams of this mixture were placed in a form and pressure molded to round patties 4 inches in diameter and 3/16 inch thick.

The percentage of fat lost (separated) during the molding process varied depending upon the fat employed in the product formed as follows:

| Product | Fat | Percent Fat Lost During Patty Formation |
|---|---|---|
| 1. (Control) | Liquid Soybean Oil (I.V. 107) | 58% |
| 2. (Invention) | Stabilized Fat (Part B) | 14% |

Product 2 formed with an ethyl cellulose stabilized fat is an example of the invention presented herein. Product 1 is not an example of the invention, and is presented to illustrate the advantage of the invention in reducing fat separation from fat-containing protein fiber food products.

Product 2 is a shaped unitary food product resembling a hamburger patty and can be characterized as a hamburger patty analog. This hamburger patty analog is heated to a temperature of 100°C for 3 minutes. This heating sets the binder more firmly. This hamburger analog product can be used as such, or dehydrated and stored for later use. On rehydration, a desirable juicy hamburger analog is again obtained. The hamburger analog product presents an excellent mouthfeel and texture resembling hamburger. The taste, however, is somewhat bland.

EXAMPLE II

The procedure followed in Example I, Part D, was repeated except that the flavor ingredients were added to the stabilized fat, with mixing, prior to gelling.

The results were substantially the same as in Example I with the exception that the product presented a superior taste (stronger, lingering).

Incorporating the flavor ingredients into the stabilized fat prior to gelling provides a notable taste advantage.

EXAMPLE III

When in Example I, corn oil or cottonseed oil is used instead of soybean oil, substantially the same results are obtained.

EXAMPLE IV

Several stabilized fats were formed following the procedure of Example I, Part B. The composition of the stabilized fats formed were as follows:

| Stabilized Fat | Ethyl Cellulose | Triglyceride | Percent Ethyl Cellulose |
|---|---|---|---|
| 1 | D.S. 2.42, Vis. Factor 45 cps. | Soybean Oil | 7.5 |
| 2 | D.S. 2.50, Vis. Factor 200 cps. | Soybean Oil | 10.0 |
| 3 | D.S. 2.50, Vis. Factor 200 cps. | Tallow | 10.0 |

When in Example II these stabilized fats are used instead of the stabilized fat employed herein, substantially the same results are obtained in that the fat does not readily separate from protein fibers, the product presents an excellent mouthfeel, and the flavor is good.

It should be understood the fat separation is not only a problem during processing, such as patty formation, but is a significant problem encountered during shipping and storage, and in use, cooking and eating. The fibrous protein food products of the invention substantially avoid this probelm, thereby providing a superior, more desirable product.

What is claimed is:

1. A protein food product comprising a mixture of edible protein fibers and a stabilized fat consisting of 85–95% edible triglyceride and from 5–15% ethyl cellulose, by weight of stabilized fat.

2. The food product of claim 1 wherein the ethyl cellulose has a D.S. of from about 2.21 to about 2.58/glucose unit.

3. The food product of claim 2 wherein the edible triglyceride has a melting point below about 100°F.

4. The food product of claim 3 wherein the edible triglyceride is liquid in vegetable oil.

5. The food product of claim 4 wherein the liquid vegetable oil is soybean oil, cottonseed oil, corn oil or mixtures thereof.

6. The food product of claim 4 wherein the ratio of protein fibers to stabilized fat is from 1:0.01 to 1:0.8, by weight.

7. The food product of claim 1 wherein the stabilized fat contains from about 5–50%, by weight stabilized fat, flavor.

8. A shaped protein food product comprising a mixture of
   edible protein fibers,
   edible binder material, and
   a stabilized fat consisting of from 85 to 95% edible triglyceride and from 5 to 15% ethylcellulose, by weight of stabilized fat,
   said mixture being bound together to form a shaped fibrous protein food product.

9. The food product of claim 8 wherein the ethyl cellulose has a D.S. of from about 2.21 to about 2.58/glucose unit.

10. The food product of claim 9 wherein the edible triglyceride has a melting point below about 100°F.

11. The food product of claim 10 wherein the edible triglyceride is liquid vegetable oil.

12. The food product of claim 11 wherein the liquid vegetable oil is soybean oil, cottonseed oil, corn oil or mixtures thereof.

13. The food product of claim 11 wherein the ratio of protein fibers to stabilized fat is from 1:0.01 to 1:0.8, by weight.

14. The food product of claim 12 wherein the stabilized fat contains from 5–50%, by weight stabilized fat, flavor.

15. The food product of claim 4 wherein the stabilized fat has a penetration value of from 220 to 90.

16. The food product of claim 10 wherein the stabilized fat has a penetration value of from 220 to 90.

* * * * *